United States Patent
McNicoll

(10) Patent No.: US 9,430,675 B2
(45) Date of Patent: Aug. 30, 2016

(54) ENCRYPTING PIN PAD

(71) Applicant: NCR Corporation, Duluth, GA (US)

(72) Inventor: Grant A. McNicoll, Angus (GB)

(73) Assignee: NCR Corporation, Duluth, GA (US)

( * ) Notice: Subject to any disclaimer, the term of this patent is extended or adjusted under 35 U.S.C. 154(b) by 94 days.

(21) Appl. No.: 13/899,068

(22) Filed: May 21, 2013

(65) Prior Publication Data

US 2014/0351959 A1    Nov. 27, 2014

(51) Int. Cl.

| G06F 21/00 | (2013.01) |
|---|---|
| G06F 21/74 | (2013.01) |
| G06F 21/86 | (2013.01) |
| G07F 19/00 | (2006.01) |
| G07F 7/10 | (2006.01) |
| H01H 13/704 | (2006.01) |

(52) U.S. Cl.
CPC ............ G06F 21/74 (2013.01); G06F 21/86 (2013.01); G07F 7/1033 (2013.01); G07F 19/2055 (2013.01); H01H 13/704 (2013.01); H01H 2201/036 (2013.01); H01H 2209/052 (2013.01); H01H 2231/006 (2013.01); H01H 2239/002 (2013.01); H01H 2239/032 (2013.01); Y04S 40/24 (2013.01)

(58) Field of Classification Search
CPC ........ G06F 21/74; G06F 21/83; G06F 21/86; H01H 13/704; H01H 2201/036; H01H 2209/052; H01H 2231/006; H01H 2239/032; H01H 2239/002; G07F 7/1033; G07F 19/2055
USPC .................... 726/34; 345/156, 168, 169, 173
See application file for complete search history.

(56) References Cited

U.S. PATENT DOCUMENTS

| 6,710,269 | B2 | 3/2004 | Kunigkeit et al. |
|---|---|---|---|
| 7,270,275 | B1 | 9/2007 | Moreland et al. |
| 7,343,496 | B1 * | 3/2008 | Hsiang et al. ............... 713/194 |
| 8,322,624 | B2 * | 12/2012 | Finn ............................. 235/492 |
| 8,621,235 | B2 | 12/2013 | Barrowman et al. |
| 9,009,860 | B2 * | 4/2015 | Klum et al. .................... 726/34 |
| 9,013,336 | B2 | 4/2015 | Schulz et al. |
| 2007/0016963 | A1 * | 1/2007 | Robinson ......................... 726/34 |
| 2008/0134349 | A1 * | 6/2008 | Fleischman et al. ........... 726/34 |
| 2008/0278355 | A1 | 11/2008 | Moore et al. |
| 2010/0181999 | A1 * | 7/2010 | Sudai ...................... G06F 21/86  324/239 |
| 2011/0095919 | A1 | 4/2011 | Ostermöller et al. |
| 2012/0020045 | A1 * | 1/2012 | Tanase ......................... 361/807 |
| 2012/0047374 | A1 * | 2/2012 | Klum et al. .................. 713/192 |
| 2012/0280923 | A1 * | 11/2012 | Vincent et al. ............... 345/173 |
| 2014/0041060 | A1 * | 2/2014 | Selwood et al. ................ 726/34 |
| 2014/0071073 | A1 * | 3/2014 | Williams et al. ............. 345/173 |
| 2014/0081858 | A1 * | 3/2014 | Block et al. ................... 705/43 |
| 2014/0253305 | A1 * | 9/2014 | Rosenberg et al. ........ 340/407.2 |

FOREIGN PATENT DOCUMENTS

| EP | 0836161 | 4/1998 |
|---|---|---|
| EP | 2431899 | 3/2012 |

OTHER PUBLICATIONS

Office Action issued in co-pending European Patent application 14158677.6 dated Jan. 29, 2016.

* cited by examiner

Primary Examiner — Mohammad A Siddiqi

(74) Attorney, Agent, or Firm — Schwegman, Lundberg & Woessner

(57) ABSTRACT

The present invention provides a method and apparatus for protecting an Encrypting PIN Pad (EPP) against tampering. The apparatus provides an EPP comprising a first layer comprising at least two spaced apart electrode elements, and a second layer comprising at least one bridge element for electrically bridging a space between the at least two electrode elements when the first layer and the second layer are urged together.

10 Claims, 6 Drawing Sheets

ENCRYPTING PIN PAD

FIELD OF THE INVENTION

The present invention relates to an Encrypting PIN (personal identification number) pad (EPP). In particular, but not exclusively, the present invention relates to an EPP including protection against malicious tampering, such as front side attacks.

BACKGROUND OF THE INVENTION

It is known for a variety of unattended PIN entry devices (PEDs) to include an encryption keyboard/keypad for a customer to enter a PIN code in a secure manner. Such a keypad is known in the art as an Encrypting PIN pad (or EPP) and may include only a secure PIN entry device and rely upon external displays and card readers of the PED. Alternatively, an EPP may include a secure PIN entry device and a built-in display and/or card reader.

Known PEDs include Self-Service Terminal (SSTs), such as Automated Teller Machines (ATMs), automated fuel dispensers, kiosks and vending machines, or the like. An ATM typically requires a customer to enter a secure PIN code via an EPP in the ATM for authorising a customer transaction at the ATM. Working cryptographic keys and master keys of the financial institution owning the ATM, for example, are also typically stored in core processing components of an EPP. People with malicious intent have been known to probe into an EPP in an attempt to capture customer PIN codes when they are entered, or even read working cryptographic keys and master keys of the financial institution, thereby placing customers' money (and the financial institution's money) at risk. Accordingly, the physical and logical design and manufacture of EPPs must adhere to increasingly strict requirements, regulations and certifications.

EPPs have a clearly defined physical and logical boundary and a tamper-resistant or tamper-evident shell. An EPP conventionally includes a keyboard panel, a lining plate, keys, a water-resistant sealing layer, a main control board and a base plate. The EPP is assembled by stacking up these components in sequence.

EPPs are also tamper responsive in that they will destroy critical information if the EPP is tampered with, thereby preventing the critical information, such as encryption keys, being disclosed to an attacker.

EPPs include different mechanisms to detect tampering. One type of tamper detection mechanism is for an EPP to include a probing detection and protection circuit which, in the event of a front side attack on the EPP (that is, an attempt to tamper with the EPP from the keypad side of the overall unit), outputs a self-destruct signal enabling a self-destruct function of the EPP to prevent the attacker from accessing confidential information stored in the EPP. However, such conventional systems can be bypassed or damaged to gain access to the main control board.

Another type of tamper detection mechanism is for an EPP to include a number of separation switches to indicate a tamper should the keypad, and other internals of the EPP, become separated from the EPP body. However, such switches are not perfectly protected from a front side attack on the EPP. Such attacks can be made to remove the EPP keys and either glue down the separation switches or inject electrically conductive ink under each switch to maintain contact when the EPP keypad and internals are separated from the EPP body.

SUMMARY OF THE INVENTION

It is an aim of certain embodiments of the present invention to at least partly mitigate the above-mentioned problems.

It is an aim of certain embodiments of the present invention to protect an EPP against a front side attack.

It is an aim of certain embodiments of the present invention to protect an EPP against malicious probing, prying, or injecting of electrically conductive ink and/or adhesive, or the like.

It is an aim of certain embodiments of the present invention to detect tampering of an EPP at an SST.

According to a first aspect of the present invention there is provided an Encrypting PIN Pad (EPP) comprising:
 a first layer comprising at least two spaced apart electrode elements; and
 a second layer comprising at least one bridge element for electrically bridging a space between the at least two electrode elements when the first layer and the second layer are urged together.

Aptly, the second layer comprises a composite layer, comprising electrically conductive particles combined with an elastomeric binder, to provide the at least one bridge element.

Aptly, the composite layer comprises Quantum Tunnelling Composite (QTC) (trade mark) material.

Aptly, the second layer further comprises an elastomeric layer for supporting the composite layer.

Aptly, the at least two spaced apart electrode elements comprise a first electrode surrounding a second electrode.

Aptly, the first electrode is ring-shaped and the second electrode is a central region within and spaced apart from the first electrode.

Aptly, the first layer comprises a plurality of electrical tracks printed on a flexible support, wherein a first and further track of the plurality of tracks each comprising a respective one of the two electrode elements.

Aptly, the first layer further comprises at least one protective mesh layer.

Aptly, the EPP further comprises at least one actuator member for urging the first layer and the second layer together.

Aptly, the EPP further comprises a keyboard body for supporting a plurality of keys, wherein the at least one actuator member extends inwardly from the keyboard body towards the first layer.

Aptly, the at least one actuator member is an elongate pin.

Aptly, the at least one actuator member comprises a circular or polygonal cross section having a size substantially matching at least a size of the bridge element.

Aptly, the EPP further comprises an intermediate layer located between the at least one actuator member and the first layer.

Aptly, the intermediate layer comprises at least one layer of rubber material.

Aptly, the EPP further comprises a controller for detecting unauthorised separation of the first layer and the second layer.

Aptly, the EPP further comprises a support layer for supporting the controller, wherein the support layer is located on a distal side of the first layer relative to the keyboard body.

Aptly, the EPP further comprises a spacer layer located between the first layer and the support layer.

Aptly, the spacer layer comprises at least one aperture for locating at least one electrical connection extending between the controller and the first layer and/or the second layer.

Aptly, the at least one aperture is sized to accommodate at least the controller supported on the support layer.

Aptly, the EPP further comprises an alarm device responsive to the controller for indicating unauthorised separation of the first layer and the second layer.

Aptly, the first and second layers are urged together when the first layer is urged towards the second layer, or the second layer is urged towards the first layer, or the first layer and the second layer are both urged towards each other.

According to a second aspect of the present invention there is provided a Self-Service Terminal (SST) comprising an EPP, the EPP comprising:
- a first layer comprising at least two spaced apart electrode elements; and
- a second layer comprising at least one bridge element for electrically bridging a space between the at least two electrode elements when the first layer and the second layer are urged together.

According to a third aspect of the present invention there is provided a method of detecting tampering at an Encrypting PIN Pad (EPP), comprising the steps of:
- in a normal mode of operation, providing an electrically conductive bridge via a layer in an EPP between at least two spaced apart electrode elements on a further layer of the EPP; and
- in a tamper mode of operation, removing the bridge between the electrode elements.

Aptly, the method further comprises:
monitoring an electrical resistance across the at least two spaced apart electrodes.

Aptly, the method further comprises:
determining a change in the electrical resistance across the at least two spaced apart electrodes relative to a predetermined threshold resistance.

Aptly, the method further comprises:
activating an alarm device in response to the sensed separation of the first layer and the second layer.

Aptly, the method further comprises:
activating a self-destruct function of the EPP in response to the sensed separation of the first layer and the second layer.

According to a fourth aspect of the present invention there is provided a method of manufacturing an Encrypting PIN Pad (EPP), comprising:
urging together a first layer and a second layer within a secure housing, wherein the first layer comprises at least two spaced apart electrode elements and the second layer comprises at least one bridge element, wherein, when the first layer and the second layer are urged together in a normal state of the EPP, an electrically conductive bridge is provided across a space between the at least two electrode elements said bridge being removed when the first layer and second layer are separated.

Aptly, the method further comprises:
applying a pressure to the second layer to urge the second layer towards the first layer via at least one actuator member that extends from a keyboard body at a front region of the secure housing towards the first layer.

According to a fifth aspect of the present invention there is provided an Encrypting PIN Pad (EPP) comprising:
at least one contact switch mounted on a support layer in a secure housing of the EPP; and
a protection layer, comprising at least one through hole, in the secure housing and located between the at least one contact switch and a front region of the secure housing; wherein at least one biasing pin extends from the front region through the through hole to bias the at least one contact switch in a normal state of operation.

Aptly, in a tamper state, when a front region of the secure housing supporting the at least one biasing pin is at least partially separated from the secure housing, the pin is located to no longer bias the contact switch.

Aptly, in a tamper state, the front region of the secure housing is moved away from the at least one contact switch such that the at least one biasing pin no longer biases the at least one contact switch.

Aptly, the at least one contact switch comprises a plurality of contact switches disposed in a spaced apart relationship across an internal space in the secure housing, and the at least one biasing pin comprises a plurality of biasing pins each associated with a respective one of the plurality of contact switches and a respective one of a plurality of through holes in the protection layer.

Aptly, the front region of the secure housing comprises a keyboard body for supporting a plurality of keys.

Aptly, the EPP further comprises a sealing layer disposed between the front region of the secure housing and the support layer.

Aptly, the sealing layer comprises at least one through hole for the at least one biasing pin to extend through to bias the at least one contact switch in a normal state of operation.

Aptly, the sealing layer comprises a layer of elastomeric material.

Aptly, the EPP further comprises a spacer layer located between the sealing layer and the support layer.

Aptly, the spacer layer comprises at least one recess for receiving the at least one contact switch to thereby accommodate the at least one contact switch device between the spacer layer and the support layer.

Aptly, the spacer layer comprises at least one opening communicating with the recess to allow the at least one biasing pin to extend through the spacer layer to bias the at least one contact switch.

Aptly, the at least one opening is axially aligned with the at least one through holes of the sealing layer and protection layer.

Aptly, the spacer layer comprises a metal plate.

Aptly, the at least one contact switch comprises a silicon switch body.

According to a sixth aspect of the present invention there is provided an Encrypting PIN Pad (EPP) comprising: a housing defining (i) a plurality of key apertures and (ii) a plurality of pins extending from a lower surface; a plurality of keys, each key being located within a respective one of the plurality of key apertures; a support plate mounted to the lower surface of the housing and defining (i) a plurality of key apertures, each key aperture being disposed in registration with a respective one of the plurality of keys and (ii) a plurality of pin apertures, each aperture being disposed in registration with a respective one of the plurality of pins; an elastomeric mat mounted to the support plate; a multi-layer keyboard printed circuit board comprising a plurality of key domes, each key dome being disposed in registration with a respective key, and a plurality of separation switches, each separation switch being disposed in registration with a respective one of the plurality of pins; a backplate mounted on the multi-layer keyboard printed circuit board and secured to the housing; a cryptographic printed circuit board coupled to the keyboard printed circuit board via an elongate connector; and a cover mounted on the cryptographic printed circuit board and secured to the housing to maintain the keys, the support plate, the elastomeric mat, the keyboard printed circuit board, the backplate, and the cryptographic printed circuit board in position as an integrated unit.

Certain embodiments of the present invention provide a method and apparatus for protecting an EPP against a front side attack.

Certain embodiments of the present invention provide a method and apparatus for protecting an EPP against malicious probing, prying, or injecting of electrically conductive ink and/or adhesive, or the like.

Certain embodiments of the present invention provide a method and apparatus for detecting tampering of an EPP of an SST.

BRIEF DESCRIPTION OF DRAWINGS

Embodiments of the present invention will now be described hereinafter, by way of example only, with reference to the accompanying drawings in which:

FIG. 2b illustrates a part of the EPP shown in FIG. 2a;

FIG. 3b illustrates a part of the EPP shown in FIG. 3a;

DESCRIPTION OF EMBODIMENTS

Figure 1A:
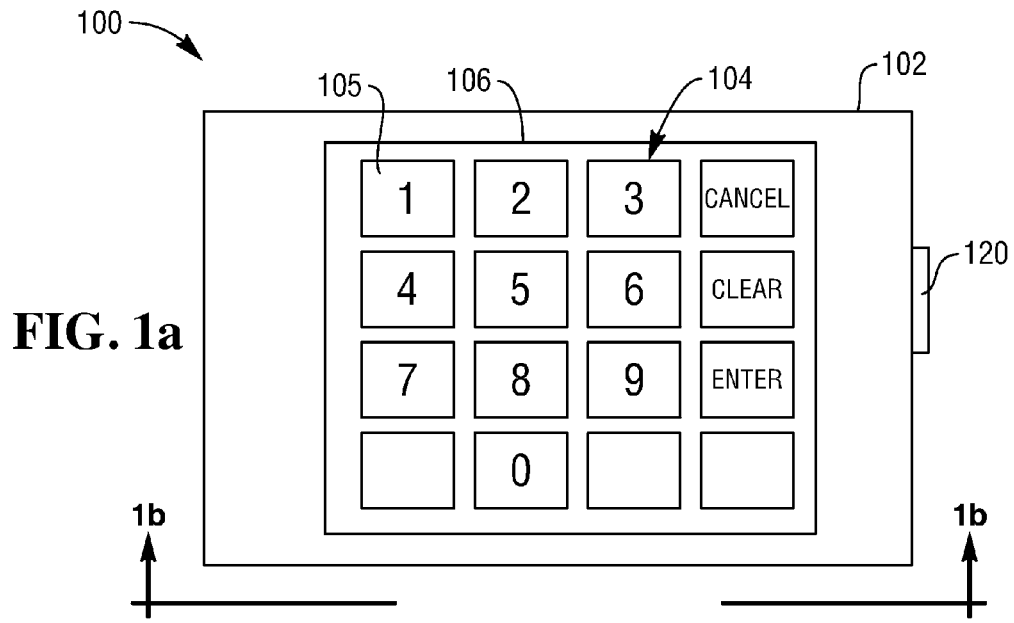
FIGS. 1a to 1c illustrate an encrypting PIN pad (EPP) according to a first embodiment of the present invention.

In the drawings like reference numerals refer to like parts.

Figure 1B:
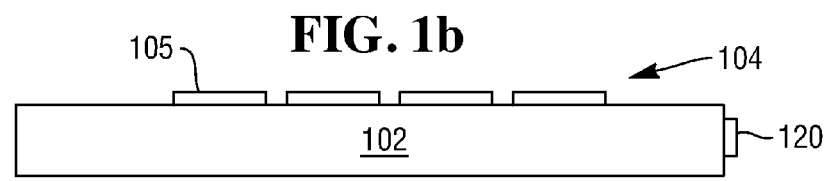

FIG. 1 illustrates an Encrypting PIN Pad (EPP) 100 according to a first embodiment of the present invention. The EPP 100 comprises a keyboard body 102 which supports a keypad 104 including sixteen individual keys 105 for a customer to use when entering his/her PIN and when making transaction selections, each key having either a digit (with one of the numbers from 0 to 9) etched or printed thereon, words such as "Cancel," "Clear", and "Enter," or such like, etched or printed thereon, or left blank. The keypad 104 protrudes from an upper surface of the EPP 100. FIG. 1b is a pictorial side view of the EPP 100 in the direction of arrows 1b-1b on FIG. 1a.

Figure 1C:
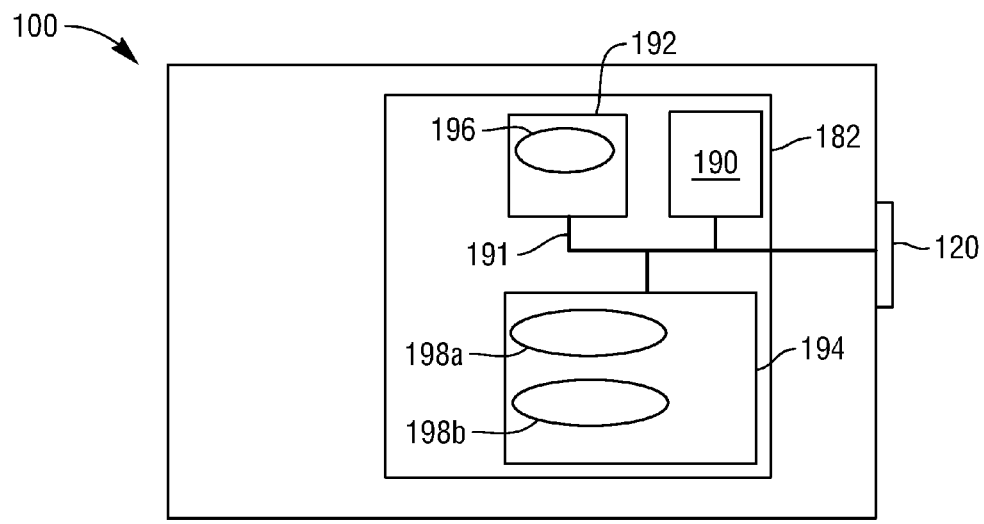

FIG. 1c is a schematic diagram of the components within the EPP 100. These components include an encryption unit 182. The encryption unit 182 includes a cryptographic processor 190, volatile memory 192 in the form of random access memory (RAM), and non-volatile memory 194 in the form of FLASH memory. The RAM 192 stores a cryptographic key 196. The FLASH memory 194 stores at least one algorithm 198a (PIN encryption algorithm 198a) for encrypting information entered via keypad 104 using the cryptographic key 196, and one algorithm 198b (key deriving algorithm 198b) for deriving a new cryptographic key.

The processor 190, the RAM 192, and the flash memory 194 communicate via an internal bus 191.

Suitable cryptographic processors 190 include one of the range of secure microcontrollers supplied by Maxim Integrated Products, Inc. of 160 Rio Robles, San Jose, Calif. 95134, U.S.A.

Data from the keypad 104 is transmitted to the cryptographic processor 190, which processes the keypad entries using a keyboard control algorithm (not shown) executing within the cryptographic processor 190. The cryptographic processor 190 also includes internal RAM (not shown) and internal non-volatile memory (not shown) for use in performing cryptographic functions. The cryptographic processor 190 includes an erase function that operates automatically to delete stored encryption keys within the cryptographic processor 190 in the event that any sensors in the EPP 100 detect tampering.

In normal operation the EPP 100 outputs encrypted data to an ATM controller module (not shown) via an output port 120 in the form of a USB port.

Figure 2A:
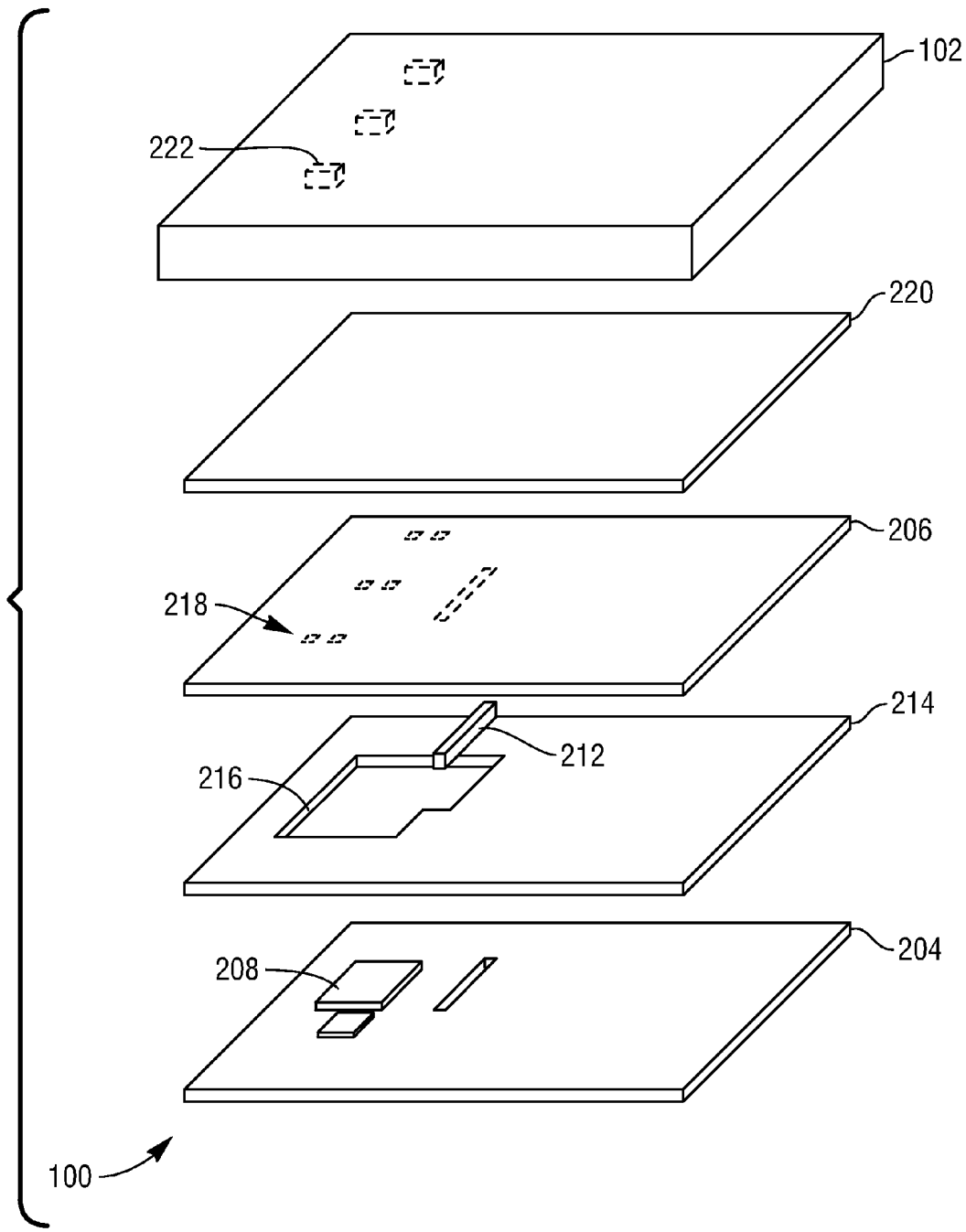
FIG. 2a illustrates an exploded schematic of the EPP of FIGS. 1a to 1c.
Figure 2B:
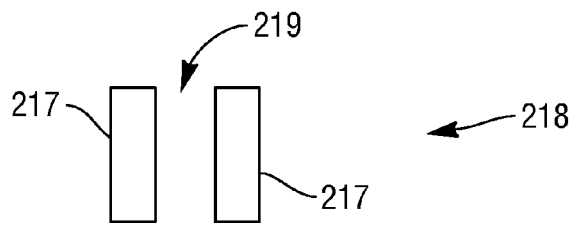

Parts of the EPP 100 are shown in more detail in FIGS. 2a and 2b. The EPP 100 includes the keyboard body 102 supporting the plurality of keys (not shown), a base layer 204, and an intermediate layer 206. The base layer 204 supports a primary printed circuit board (PCB) (not shown) of the encryption unit 182 including the processor 190 for performing encryption functions of the EPP 100. The intermediate layer 206 supports a secondary PCB (not shown) including the keypad matrix circuit responsive to the keys supported by the keyboard body 102. The primary and secondary PCBs are connected by a suitable electrical connection, such as a 'zebra strip' 212. A metal spacer plate 214 is located between the base layer 304 and the intermediate layer 206. The spacer layer 214 includes a through aperture 216 for accommodating one or more electronic components 208 of the primary PCB and the zebra strip 212 when the EPP 100 is securely assembled and in a 'normal' state.

The intermediate layer 206 also supports pairs of spaced apart electrodes 218. The pairs of electrodes 218 are spaced apart from each other across the intermediate layer 206. Three pairs of spaced apart electrodes 218 are shown in FIG. 2a for ease of reference, but any desired number of pairs of spaced apart electrodes may be chosen. As shown in FIG. 2b, the electrodes 217 of a respective pair of spaced apart electrodes 218 are separated from each other by a space 219.

A layer of Quantum Tunnelling Composite (QTC™) material 220 is disposed between the pairs of spaced apart electrodes 218 and the keyboard body 102. The QTC™ material layer 220 may be a single sheet of QTC™ material or may be a composite layer of QTC™ material supported on the underside of a sheet of rubber (or other elastomeric) material. QTC™ material is a composite material made from conductive filler particles combined with an elastomeric binder, typically silicon rubber. QTC™ material has the ability to smoothly change from an electrical insulator to a metal-like conductor when placed under pressure.

An actuator 222 in the form of a block extends inwardly from the keyboard body 102 towards a respective pair of spaced apart electrodes 218. Three actuators 222 are shown in FIG. 2a for ease of reference, each actuator being appropriately located in relation to a respective pair of spaced apart electrodes 218. Each actuator 222 is shown as a rectangular block but may be any suitable size or shape relative to the size and shape of a respective pair of electrodes 218 and the distance a respective pair of electrodes is spaced apart from each other. The actuator 222 may be any suitable material, such as metal or plastic, for example and may be attached as a separate part to the keyboard body 102 or integral with the keyboard body 102. The actuator 222 is rigid enough to be able to transfer a force from the keyboard body 102 and apply a pressure on the QTC™ sheet 220.

In an assembled and 'normal' state, each actuator 222 applies a pressure to a respective region of the QTC™ layer 220 to thereby change its state from an insulator to an electrical conductor. In the assembled and normal state of the EPP 100, the QTC™ layer 220 contacts the pairs of spaced apart electrodes 218 and when the state of respective regions of the QTC™ layer 220 is changed to an electrically conductive state by the pressure being applied thereto by the respective actuators 222, an electrical bridge is formed across the space 219 between a respective pair of spaced apart electrodes 218.

An electrical resistance across each of the bridges is monitored by the encryption unit 182 and a threshold resistance is determined when the EPP 100 is in a 'normal' state. The resistance across each of the bridges relative to the threshold resistance will not change when the EPP is in a 'normal' state. However, if the keyboard body 102 is moved away from the intermediate layer 206, as would be the case when a front attack on the EPP is made, the pressure being applied on the QTC™ layer by the actuators 222 would decrease, the electrical conductivity of the respective regions of the QTC™ layer would decrease accordingly, and the electrical resistance being monitored across each of the bridges would increase. This change in resistance relative to the threshold resistance is detected by the encryption unit 182 to indicate a tamper of the EPP 100. Similarly, if conductive ink is maliciously injected into the EPP 100 via the keyboard body 102 to come between the QTC™ layer 220 and a respective pair of spaced apart electrodes 218, the electrical resistance being monitored across a respective bridge decreases. This change in resistance relative to the threshold resistance is detected by the encryption unit 182 to indicate a tamper of the EPP 100. In the event of a tamper being detected, an alarm device (not shown) is activated in an attempt to warn off a criminal and/or a self-destruct function of the EPP 100 is activated accordingly.

Figure 3A:
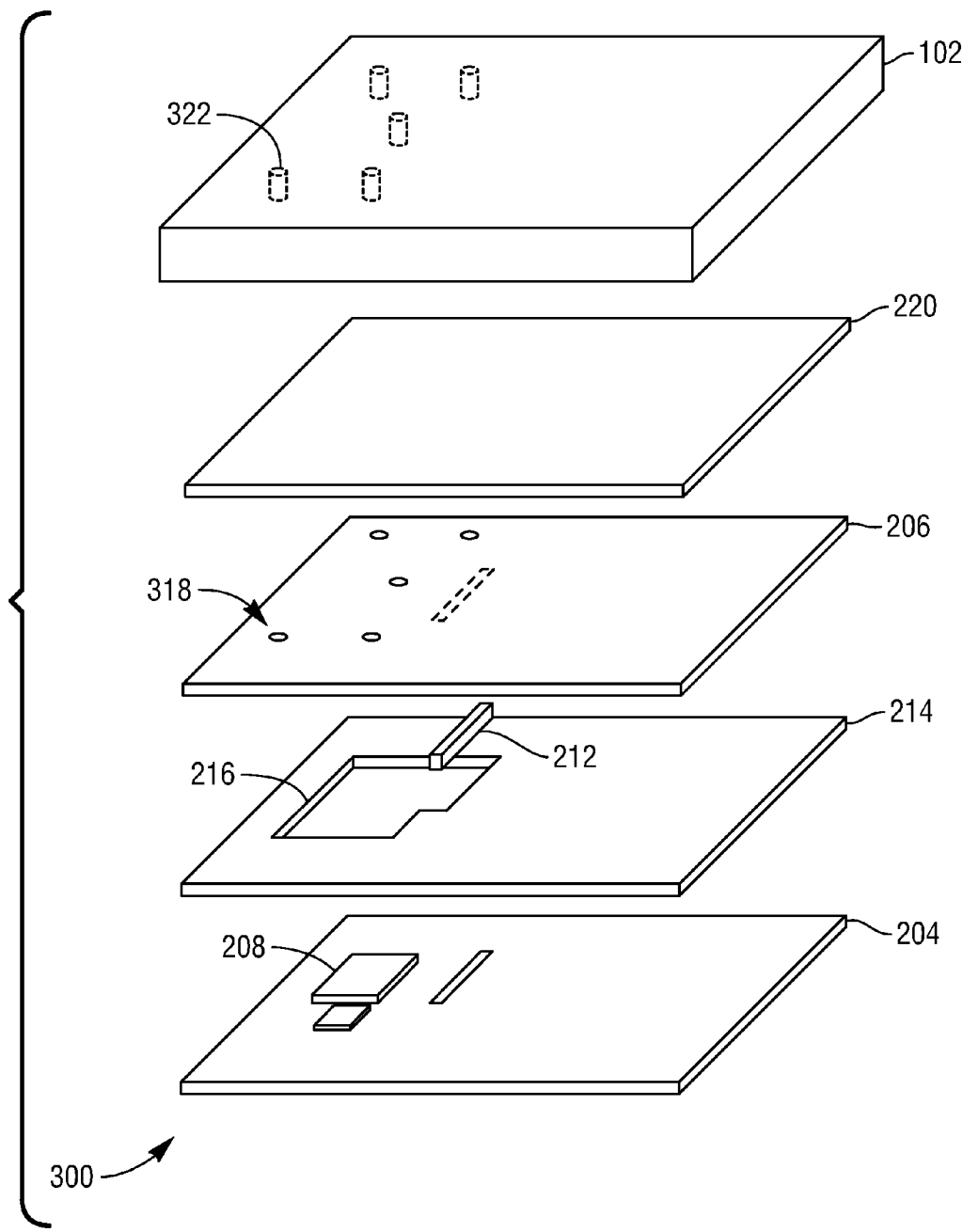
FIG. 3a illustrates an exploded schematic of an EPP according to a second embodiment of the present invention.
Figure 3B:
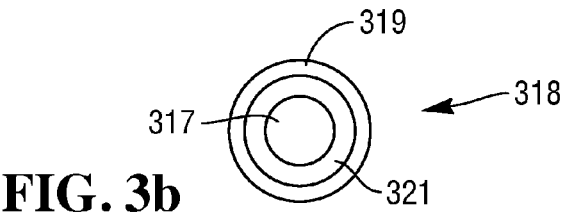

An EPP 300 according to a second embodiment of the present invention is illustrated in FIGS. 3*a* and 3*b*. In this embodiment, as best shown in FIG. 3*b*, each pair of spaced apart electrodes 318 comprises a ring-shaped electrode 319 and a central electrode 317 located within and spaced apart from the ring-shaped electrode 319 to provide a space 321 therebetween. Each of the actuators 322 is a cylindrical metal post which is shaped and sized to match the shape and size of a respective pair of electrodes 318. It will be understood that other suitable shapes and sizes of electrode pairs and respective actuators can be provided according to certain other embodiments of the present invention.

Figure 4:
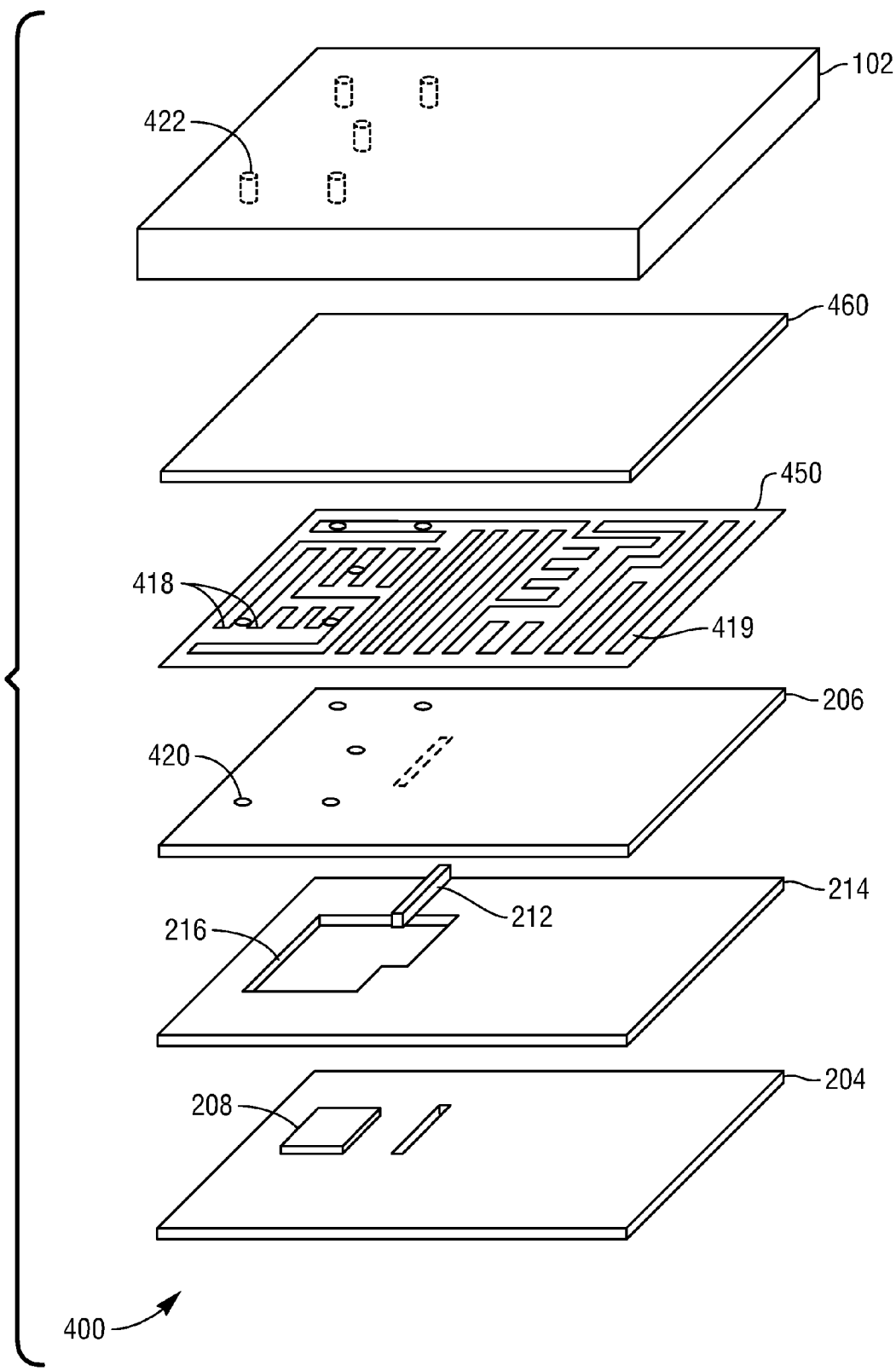
FIG. 4 illustrates an exploded schematic of an EPP according to a third embodiment of the present invention.

An EPP 400 according to a third embodiment of the present invention is illustrated in FIG. 4. In this embodiment, the QTC™ layer shown in the previous embodiments is replaced with a flexible support layer 450 having a plurality of spaced apart electrical tracks 419 printed on it. A pair of adjacent electrical tracks of the plurality of electrical tracks provides a pair of spaced apart electrodes 418. The intermediate layer 206 supports an electrical bridge element 420 which is located relative to a respective pair of electrodes 418. Of course, the plurality of electrical tracks 419 can be shaped and designed to provide a number of spaced apart pairs of electrodes 418. For ease of reference, three bridge elements 420 are shown in FIG. 4 which are each located relative to three respective pairs of spaced apart electrodes 418. In a 'normal' assembled state of the EPP, each bridge element 420 contacts a respective pair of electrodes 418 to form an electrical bridge across a space provided between the electrodes 418. A sealing layer 460 of rubber material is disposed between the flexible support layer 450 and the keyboard body 102 to seal the EPP 400 to prevent ingress of water and/or dirt. This sealing layer 460 also provides tactile feedback to the keys and helps prevent over-travel of the keys otherwise caused by manufacturing tolerances. The actuators 422 as shown in FIG. 4 are metal posts extending inwardly from the keyboard body 102 towards the back of the EPP 400 to urge the sealing layer 460 towards the intermediate layer 206 to ensure the spaced apart electrodes 418 contact their respective bridge elements 420 in a 'normal' assembled state of the EPP 400.

An electrical resistance across each of the bridges is monitored by the encryption unit 182 and a threshold resistance determined for when the EPP 400 is in a 'normal' assembled state can be compared to the monitored resistance. The resistance across each of the bridges relative to the threshold resistance will not change when the EPP 400 is in a 'normal' assembled state. However, if the keyboard body 102 and flexible support layer 450 is wholly or at least partially moved away from the intermediate layer 206 in an attempt to gain access to the primary PCB supported on the base layer 204, the respective bridges are entirely or partly broken and in turn the open circuit condition causes the electrical resistance being monitored across each of the bridges to increase. This change in resistance relative to the threshold resistance is detected by the encryption unit 182 to indicate a tamper event at the EPP 400. Similarly, if conductive ink is maliciously injected into the EPP 400 via the keyboard body 102 to come between the electrical tracks 419 of the flexible support layer 450 and the respective bridge elements 420, the electrical resistance being monitored across a respective bridge decreases. This change in resistance relative to the threshold resistance is detected by the encryption unit 182 to indicate a tamper event of a different type at the EPP 400. In the event of a tamper being detected, an alarm device (not shown) is activated in an attempt to warn off a criminal and/or a self-destruct function of the EPP 400 is activated accordingly.

Figure 5:
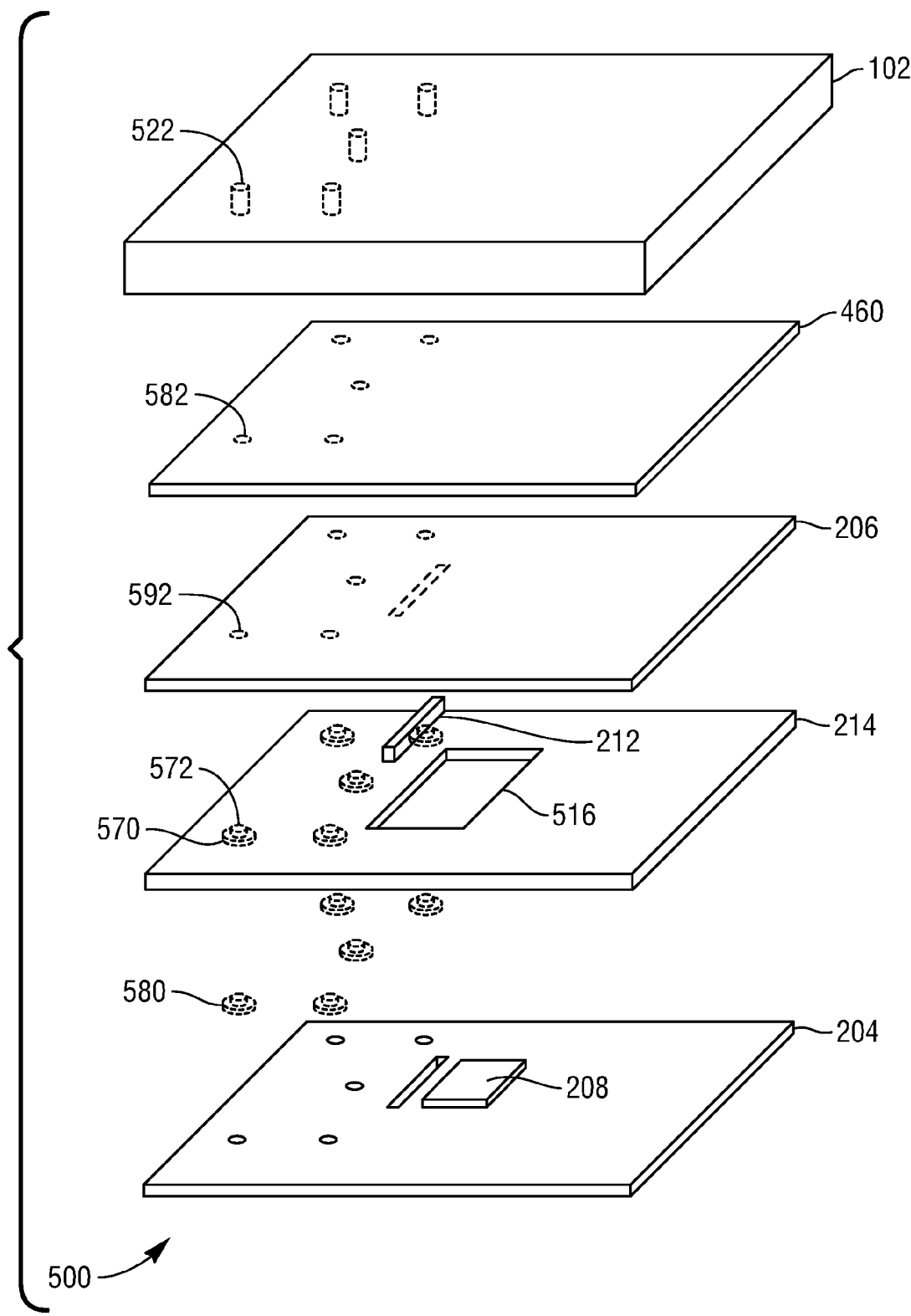
FIG. 5 illustrates an exploded schematic of an EPP according to a fourth embodiment of the present invention.

An EPP 500 according to a fourth embodiment of the present invention is illustrated in FIG. 5. In this embodiment, the metal spacer plate 214 located between the base layer 204 and the intermediate layer 206 has a plurality of recesses 570 provided in the underside of the spacer plate 214, wherein the underside is proximal to the base layer 204. Each recess 570 is sized and shaped to receive and accommodate a respective contact switch 580. A suitable contact switch may be a silicon switch, for example. The spacer layer 214 includes a through aperture 516 for accommodating one or more electronic components 208 of the primary PCB and the zebra strip 212 for connecting the primary and secondary PCBs when the EPP 500 is securely assembled and in a 'normal' state.

A through aperture 572 is centrally disposed in each recess of the spacer plate 214. The actuators 522 of this embodiment are elongate metal posts each sized to engage a respective contact switch 580 when the EPP 500 is in a 'normal' assembled state. When the EPP 500 is in a 'normal' state, each contact switch 580 is held in a closed state by its respective actuator 522. To allow each actuator 522 to engage a respective contact switch 580, respective through apertures 582, 592 are provided in the sealing layer 460 of rubber material and the intermediate layer 206 respectively.

Malicious separation of the keyboard body 102 away from the remainder of the EPP 500, and thus away from the contact switches 580, causes the switches 580 to change from the closed state to an open state. This change is detected by the encryption unit 182 to indicate a tamper of the EPP 500. In the event of a tamper being detected, an alarm device (not shown) is activated in an attempt to warn off a criminal and/or a self-destruct function of the EPP 500 is activated accordingly.

Figure 6:
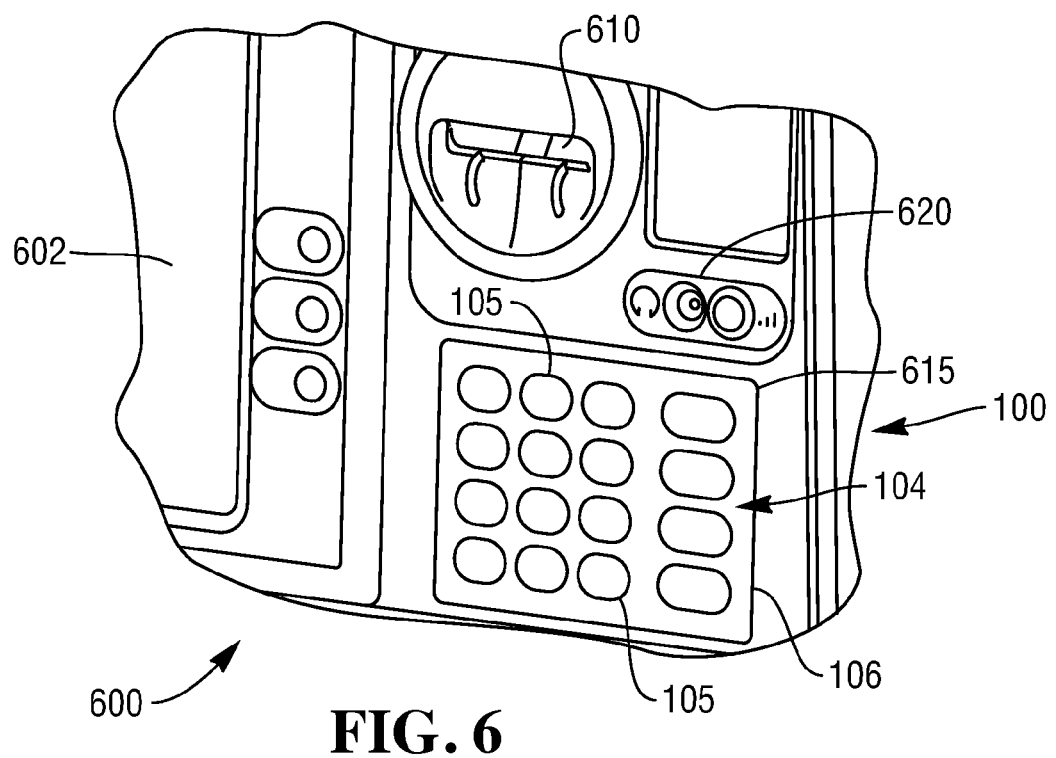
FIG. 6 illustrates part of a user interface of an Automated Teller Machine (ATM) including an EPP according to any of the described embodiments of the present invention.

An ATM typically includes a user interface for a customer to initiate a transaction at the ATM. Certain parts of an ATM user interface 600 according to an embodiment of the present invention are shown in FIG. 6. The user interface 600 includes a card reader/writer slot 610, a display 602, and an EPP 100 according to an embodiment of the present invention. The user interface 600 can optionally include other access ports/slots, such as a private audio port 220. The keypad 104 of the EPP 100 provides an interface between a customer and the EPP 100. A keypad aperture 615 of the ATM aligns with the keypad perimeter 106 of the EPP 100 so that only the keypad 104 of the EPP 100 is visible to an ATM customer through the keypad aperture 615 of the ATM. It will be understood however that an EPP according to any embodiment of the present invention as described herein may be utilised with other types of SST, such as automated fuel dispensers, kiosks and vending machines, or the like.

Throughout the description and claims of this specification, the words "comprise" and "contain" and variations of them mean "including but not limited to" and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

What is claimed is:

1. An Encrypting PIN Pad (EPP) comprising:
 a keyboard body for supporting a plurality of keys including at least one actuator member extending inwardly from the keyboard body;
 a first layer comprising at least two electrode elements separated by a space;
 a second layer between the first layer and the keyboard body comprising at least one bridge element;
 wherein the actuator member applies pressure to the bridge element in a normal state, causing the bridge element to electrically bridge the space between the at least two electrode elements, wherein the bridge element fails to electrically bridge the space during a tamper state resulting from unauthorized separation of the keyboard body from the first layer; and
 a controller for detecting the tamper state by monitoring resistance of the bridge element wherein a failure of the bridge element to electrically bridge the at least two electrode elements is identified when the resistance increases above a threshold resistance.

2. The EPP as claimed in claim 1, wherein the second layer comprises a composite layer, comprising electrically conductive particles combined with an elastomeric binder, to provide the at least one bridge element.

3. The EPP as claimed in claim 2, wherein the composite layer comprises Quantum Tunnelling Composite (QTC™) material.

4. The EPP as claimed in claim 2, wherein the second layer further comprises a rubber layer for supporting the composite layer.

5. The EPP as claimed in claim 1, wherein the at least two spaced apart electrode elements comprise a first electrode surrounding a second electrode.

6. The EPP as claimed in claim 1, wherein the first layer comprises a plurality of electrical tracks printed on a flexible support, wherein a first and further track of the plurality of tracks each comprising a respective one of the two electrode elements.

7. The EPP as claimed in claim 1, further comprising an intermediate layer located between the at least one actuator member and the first layer.

8. The EPP as claimed in claim 1, wherein the first and second layers are urged together when the first layer is urged towards the second layer, or the second layer is urged towards the first layer, or the first layer and the second layer are both urged towards each other.

9. A Self-Service Terminal (SST) comprising an EPP as claimed in claim 1.

10. An Encrypting PIN Pad (EPP comprising:
 a housing defining (i) a plurality of key apertures and (ii) a plurality of pins extending from a lower surface;
 a plurality of keys, each key being located within a respective one of the plurality of key apertures;
 a support plate mounted to the lower surface of the housing and defining (i) a plurality of key apertures, each key aperture being disposed in registration with a respective one of the plurality of keys and (ii) a plurality of pin apertures, each aperture being disposed in registration with a respective one of the plurality of pins;
 an elastomeric mat mounted to the support plate;
 a multi-layer keyboard printed circuit board comprising a plurality of key domes, each key dome being disposed in registration with a respective key, and a plurality of separation switches, each separation switch being activated by pressure from a respective one of the plurality of pins during a normal mode of operation and being deactivated during a tamper mode of operation when the housing is separated from the multi-layer keyboard printed circuit board;
 a backplate mounted on the multi-layer keyboard printed circuit board and secured to the housing;
 a cryptographic printed circuit board coupled to the keyboard printed circuit board via an elongate connector; and a cover mounted on the cryptographic printed circuit board and secured to the housing to maintain the keys, the support plate, the elastomeric mat, the keyboard printed circuit board, the backplate, and the cryptographic printed circuit board in position as an integrated unit.

\* \* \* \* \*